United States Patent Office 2,970,941
Patented Feb. 7, 1961

2,970,941

FUNGICIDAL 2,4-DINITRO-PHENYLHYDRAZONES

Robert L. Holbrook, Riderwood, Md., assignor to Olin Mathieson Chemical Corporation, a corporation of Virginia No Drawing. Filed Sept. 9, 1958, Ser. No. 759,852

9 Claims. (Cl. 167—30)

This invention relates to novel composition of matter. More particularly, it relates to non-phytotoxic, foliar fungicides containing one or more 2,4-dinitrophenylhydrazones of halogen-substituted aliphatic and cycloaliphatic aldehydes and ketones.

It is known that it is a failing of many of the compounds suggested for use as foliar fungicides, some of which are halogen-substituted or contain nitro groups or a hydrazone structure, that they are phytotoxic, as well as active as fungicides. Consequently, since a prime requisite is the preservation of the foliage being treated, such compounds have no practical value in the control of fungus diseases in plants.

On the other hand, it is also known that various phenylhydrazones are fungicidal, but that the 2,4-dinitrophenylhydrazones of aliphatic aldehydes and ketones are inactive against fungi. Thus, according to Plant Disease Reporter Supplement No. 205 of January 15, 1951 and U.S.D.A. Report No. E-815, formaldehyde 2,4-dinitrophenylhydrazone showed no activity against Monolinia fructicola or Glomerella cingulata. Furthermore, we have found that the 2,4-dinitrophenylhydrazones of acetaldehyde, propionaldehyde, butyraldehyde, acetone and methyl ethyl ketone were substantially ineffective against Monolinia fructicola in a standard spore germination test. They all showed $ED_{50}$ values greater than 250 parts per million, $ED_{50}$ being defined as the estimated dose to produce 50 percent inhibition. In the same test, 2,4-dinitrophenylhydrazine itself showed less than 50 percent inhibition at 125 parts per million, the highest concentration tested. The $ED_{50}$ value was, thus, over 125 parts per million.

In view of the foregoing, therefore, it is surprising that the compositions of the present invention containing 2,4-dinitrophenylhydrazones of 1 to 3 halogen atom-substituted aliphatic and cycloaliphatic aldehydes and ketones having 2 to 6 carbon atoms are non-phytotoxic, foliar fungicides. It is surprising, on the one hand, that such compositions are non-phytotoxic, despite the halogen and nitro group substituents and the hydrazone structure of their active ingredient. Even when applied at a rate of 16 pounds per acre of active ingredient—a rate much higher than is necessary to provide complete control of fungal diseases—these compounds are substantially non-phytotoxic. It is surprising, on the other hand, that despite the fact that their active ingredient differs structurally from inactive compounds only in its halogen substitution, such compositions are excellent foliar fungicides.

As noted, the active ingredient of the compositions of the present invention is at least one 2,4-dinitrophenylhydrazone of a 1 to 3 halogen atom-substituted aliphatic or cycloaliphatic aldehyde or ketone having 2 to 6 carbon atoms. Chlorine is the halogen atom substituent which is particularly preferred, because of economy, ease of preparation, stability and effectiveness. Included in the group of active ingredients are the 2,4-dinitrophenylhydrazones of mono-, di- and tri-chloroacetaldehyde and mono-, di- and tri-chloracetone which are comprehended by the formula

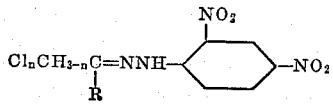

in which n is an integer from 1 to 3 and R is hydrogen, methyl or chloromethyl. Also included in the present invention are the 2,4-dinitrophenylhydrazones of mono-, di- and tri-chlorocyclohexanone. Specific examples within these categories are the 2,4-dinitrophenylhydrazones of monochloroacetaldehyde, dichloroacetaldehyde, trichloroacetaldehyde, monochloroacetone, 1,3-dichloroacetone and 2-chlorocyclohexanone. Other compounds effective as non-phytotoxic, foliar fungicides are the 2,4-dinitrophenylhydrazones of alpha-chlorobutyraldehyde, of beta-chlorobutyraldehyde, of alpha-bromoacetaldehyde, of alpha-bromopropionaldehyde, and of alpha-iodoacetaldehyde. Generally, the active ingredient of the compositions of the present invention is a 2,4-dinitrophenylhydrazone having a formula

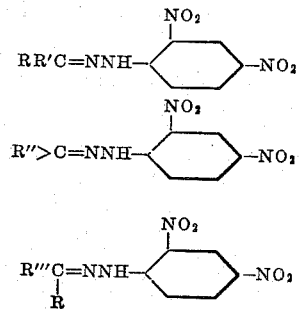

or where R is selected from the group consisting of hydrogen, methyl and chloromethyl, R' is a halogenated aliphatic radical having 2 to 6 carbon atoms and 1 to 3 halogen atoms, R" is a halogenated cycloaliphatic radical having 3 to 6 carbon atoms and 1 to 3 halogen atoms, and R''' is a cyclomethylene group having 3 to 6 carbon atoms and including at least one halomethylene.

The fungicidal compositions of the present invention are suitably diluted compositions of the 2,4-dinitrophenylhydrazones. In order to obtain the advantageous results described herein, the active materials are diluted to form dusts, wettable powders, emulsifiable pastes or aqueous suspensions. It is important in all these diluted compositions that the particle size of the active ingredient be within the range of about 0.2 to 50 microns. A range of about 5 to 30 microns is preferred. This small particle size is obtained in any suitable manner, but two methods are particularly useful. When an aqueous susspension is to be prepared, 10 to 15 milliliters of an acetone solution of the 2,4-dinitrophenylhydrazone is poured into 300 to 400 milliliters of water containing a wetting agent. Tween 20 (a polyoxyalkylene derivative of sorbitan monolaurate) is suitable, but other suitable wetting agents may be used. Igepon T-73 (a sodium N-methyl N-oleyltaurate) or Agrimul MS (a liquid sulfated fatty acid) are preferred. In these aqueous suspensions, the concentration of 2,4-dinitrophenylhydrazone is suitable from about 5 to 2400 parts per million and the concentration of wetting agent is suitably about 0.001 to 0.01 percent based on the total suspension.

In the wettable powders, the concentration of active ingredient is preferably about 25 to 80 percent by weight and the diluent comprises talc or any one of a combination of clays, for example, clays of the attapulgite, kaolinite or montmorillonite type. Of these, talc is preferred. Suitable suspending agents include, particularly, the ligno-sulfonate products obtained from the pulping of wood. Their proportion in the composition is about 1 to 4 percent. Suitable wetting agents include the sulfonated amides, sulfonated amines, sulfonated ethers, sulfonated esters and polyethylene glycol esters of fatty acids. Igepon T-73 and Agrimul MS are preferred wetting agents.

In the solid compositions, the particle size is preferably reduced to below 25 microns by grinding the compound with a large amount of inert diluent, adding a suspending agent and/or a wetting agent to form a wettable powder.

Suitable concentrations for application to foliage by spraying are preferably in the range of about 0.25 to 2 pounds of active ingredients per hundred gallons of spray mixture or about 300 to 2400 parts per million. In use, these sprays are applied to the plants until run-off occurs.

Example I

The 2,4-dinitrophenylhydrazone of chloroacetaldehyde was tested by the method described in Phytopathology, 37, 354-356 (1947) and known as the "Test Tube Dilution Technique for use with the Slide Germination Method of Evaluating Protectant Fungicides." In this test using *Monolinia fructicola*, the $ED_{50}$ was 1.1 p.p.m. compared with 1.6 for Captan (N-trichloromethylthiotetrahydrophthalimide), a commercially accepted foliar fungicide.

Example II

The 2,4-dinitrophenylhydrazone of chloroacetaldehyde was suspended in water by ball milling the compound with water and a wetting agent for one hour and and then diluting to the desired concentration. The wetting agent was Tween 20 (a polyoxyalkylene derivative of sorbitan monolaurate). Dilutions of 10, 20, 50, 100 and 500 parts per million of the 2,4-dinitrophenylhydrazone were thus prepared and a group of 16 cucumber plants was sprayed with 140 milliliters of each suspension. All of the plants were then sprayed uniformly with a suspension of spores of the anthracnose disease organism, *Collectotrichum lagenarum*, obtained from cultures grown on potato-dextrose agar. All of the plants were maintained in a moist chamber at 100 percent relative humidity and at a temperature of 75° F. for 24 hours and then in a greenhouse until the disease developed (3 to 4 days). The number of lesions per plant was counted. The untreated check was taken to be 100 percent infected and the concentration of active ingredient necessary to give 95 percent inhibition of this disease was calculated. The $ED_{95}$ thus calculated for the 2,4-dinitrophenylhydrazone of chloroacetaldehyde was 55 parts per million. In these tests, no phytotoxicity was observed at spray concentrations as high as 500 parts per million.

Example III

Tomato plants were tested using suspensions of chloroacetaldehyde 2,4-dinitrophenylhydrazone prepared as described in Example II. Concentrations of 62.5, 125, 250 and 500 parts per million were used. 140 milliliters of each suspension were sprayed onto three tomato plants. The plants were then sprayed uniformly with a suspension of spores of *Alternaria solani*, the organism causing the early blight disease of tomatoes. The plants were held in a moist chamber at 100 percent relative humidity and a temperature of 75° F. for 40 hours and then maintained in the greenhouse until disease lesions had developed (1 to 2 days). The number of lesions on each plant was counted and compared with the untreated checks which were taken to be 100 percent infected. The calculated $ED_{95}$ was 450 parts per million.

Example IV

The 2,4-dinitrophenylhydrazone of dichloroacetaldehyde was tested by the spore germination test of Example I against *Monolinia fructicola*. Complete inhibition of germination of spores occurred at all concentrations down to 1.25 p.p.m. The $ED_{50}$ is, therefore, under 1.25 parts per million. In the cucumber anthracnose test as described in Example II, the 2,4-dinitrophenylhydrazone of dichloroacetaldehyde showed $ED_{95}$ of 23 and 42 p.p.m. in duplicate tests.

Example V

The 2,4-dinitrophenylhydrazone of trichloroacetaldehyde was tested by the spore germination test of Example I. In this test, using *Monolinia fructicola*, the $ED_{50}$ is 0.6 parts per million. In the cucumber anthracnose test, carried out as described in Example II, the $ED_{95}$ of this compound was 18 parts per million.

Example VI

The 2,4-dinitrophenylhydrazone of chloroacetone was tested by the spore germination test described in Example I and gave an $ED_{50}$ of 3.6 parts per million. In the cucumber anthracnose test carried out as described in Example II, the $ED_{95}$ of this compound was 50 parts per million. In the tomato early blight test of Example III, the 2,4-dinitrophenylhydrazone of chloroacetone showed an $ED_{95}$ of 43 p.p.m.

Example VII

The 2,4-dinitrophenylhydrazone of 1,3-dichloroacetone was tested by the spore germination test of Example I. The $ED_{50}$ value against *Monolinia fructicola* was under 0.15 part per million.

Example VIII

The 2,4-dinitrophenylhydrazone of 2-chlorocyclohexanone was tested by the same spore germination technique against *Monolinia fructicola*. The $ED_{50}$ was under 12.5 parts per million.

Example IX

A wettable powder containing 50 parts by weight of the 2,4-dinitrophenylhydrazone of chloroacetaldehyde, 46 parts per weight of Barden clay (a silicate mineral of the kaolinite group), 1 part by weight of Marasperse N (a lignosulfonate dispersing agent) and 3 parts by weight of Igepon T-73 (a sodium N-methyl N-oleyltaurate) was finely ground in a ball mill until the particle size was below 25 microns. The $ED_{95}$ of this composition in the cucumber anthracnose test described in Example II was 60 p.p.m.

Example X

A wettable powder containing 50 parts by weight of the 2,4-dinitrophenylhydrazone of chloroacetaldehyde, 45 parts by weight of Barden clay, 2 parts by weight of Marasperse and 3 parts by weight of Igepon AP-78 (a high molecular weight ester of sodium isethionate) was finely ground in a ball mill to a particle size below 25 microns.

Example XI

A wettable powder was formulated which contained 50 parts by weight of the 2,4-dinitrophenylhydrazone of chloroacetaldehyde, 46 parts by weight of Barden clay, 1 part by weight of Marasperse and 3 parts by weight of Igepon-T (a sodium N-methyl-N-acyltaurate).

Example XII

A dust base composition was formulated which contained 50 parts by weight of the 2,4-dinitrophenylhydrazone of chloroacetaldehyde and 50 parts by weight of Barden clay and was ground in a ball mill to a particle size below 25 microns.

Example XIII

A dust base composition was formulated which contained 50 parts by weight of the 2,4-dinitrophenylhydrazone of chloroacetaldehyde and 50 parts by weight of Silene (a synthetic powdered calcium silicate) and was finely ground in a ball mill to a particle size below 25 microns.

Example XIV

A dust base composition was formulated which contained 50 parts by weight of the 2,4-dinitrophenylhydrazone of chloroacetaldehyde and 50 parts by weight of Attaclay and was finely ground in a ball mill to a particle size below 25 microns.

Example XV

A 25 percent emulsifiable paste was prepared by passing a mixture of 25 parts by weight of the 2,4-dinitrophenylhydrazone of chloroacetaldehyde, 25 parts by weight of Barden clay, 40 parts by weight of odorless kerosene and 10 parts by weight of water through a colloid mill until homogeneous. One part of this paste, when stirred with 1000 parts by weight of water, yielded a stable suspension suitable for spray applications.

Example XVI

A wettable powder was formulated which contained 25 parts by weight of the 2,4-dinitrophenylhydrazone of chloroacetaldehyde, 70 parts by weight of talc, 2 parts by weight of Marasperse N and 3 parts by weight of Igepon T–73. The composition was ground in a micropulverizer followed by ball-milling, thus reducing the particle size to 5–10 microns. When tested against cucumber anthracnose disease by the method described in Example II, the $ED_{95}$ was 20 parts per million.

Example XVII

The 2,4-dinitrophenylhydrazone of bromoacetaldehyde was tested by the spore germination test described in Example I. Inhibition amounting to 98 percent was obtained at 25 parts per million.

Example XVIII

The 2,4-dinitrophenylhydrazone of 2,2,3-trichloropropionaldehyde was tested by the spore germination test of Example I. Inhibition of 100 percent was obtained at 25 parts per million.

Example XIX

The 2,4-dinitrophenylhydrazone of 2,3-dichloropropionaldehyde was tested by the spore germination test of Example I. Inhibition of 100 percent was obtained at 25 parts per million.

What is claimed is:

1. A composition of matter effective against foliar fungi containing from about 5 parts per million by weight to 80 percent by weight of at least one compound having a particle size of from about 0.2 to 50 microns the compound being a 2,4-dinitrophenylhydrazone having a formula selected from the group consisting of

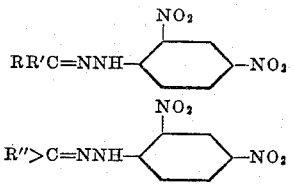

and

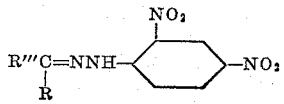

where R is selected from the group consisting of hydrogen, methyl and chloromethyl, R' is a halogenated aliphatic radical having 2 to 6 carbon atoms and 1 to 3 halogen atoms, R" is a halogenated cycloaliphatic radical having 3 to 6 carbon atoms and 1 to 3 halogen atoms, and R''' is a cyclomethylene group having 3 to 6 carbon atoms and including at least one halomethylene.

2. The composition of claim 1 in which the halogen is chlorine.

3. The composition of claim 1 in which the particle size is from about 5 to 30 microns.

4. An aqueous suspension effective against foliar fungi containing from about 5 to 500 parts per million by weight of at least one compound having a particle size of from about 0.2 to 50 microns the compound being a 2,4-dinitrophenylhydrazone having a formula selected from the group consisting of

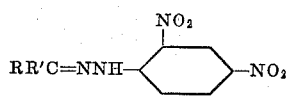

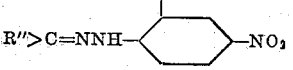

and

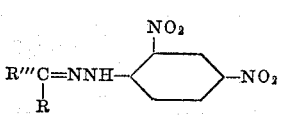

where R is selected from the group consisting of hydrogen, methyl and chloromethyl, R' is a halogenated aliphatic radical having 2 to 6 carbon atoms and 1 to 3 halogen atoms, R" is a halogenated cycloaliphatic radical having 3 to 6 carbon atoms and 1 to 3 halogen atoms, and R''' is a cyclomethylene group having 3 to 6 carbon atoms and including at least one halomethylene.

5. The composition of claim 4 containing from about 0.001 to 0.01 percent by weight of a wetting agent.

6. A wettable powder effective against foliar fungi containing from about 25 to 80 percent by weight of at least one compound having a particle size of from about 0.2 to 50 microns the compound being a 2,4-dinitrophenylhydrazone having a formula selected from the group consisting of

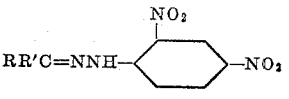

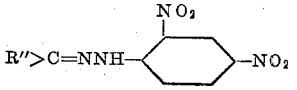

and

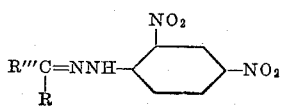

where R is selected from the group consisting of hydrogen, methyl and chloromethyl, R' is a halogenated aliphatic radical having 2 to 6 carbon atoms and 1 to 3 halogen atoms, R" is a halogenated cycloaliphatic radical having 3 to 6 carbon atoms and 1 to 3 halogen atoms, and R''' is a cyclomethylene group having 3 to 6 carbon atoms and including at least one halomethylene.

7. The composition of claim 6 containing from about 1 to 4 percent by weight of a wetting agent.

8. In the control of foliar fungi, the method of applying to the foliage a composition of matter containing from about 300 parts per million to 80 percent by weight of at least one compound having a particle size of from about 0.2 to 50 microns the compound being a 2,4-dinitrophenylhydrazone having a formula selected from the group consisting of

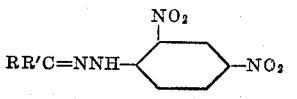

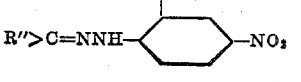

and $$R'''C(R)=NNH-C_6H_3(NO_2)_2$$

where R is selected from the group consisting of hydrogen, methyl and chloromethyl, R' is a halogenated aliphatic radical having 2 to 6 carbon atoms and 1 to 3 halogen atoms, R'' is a halogenated cycloaliphatic radical having 3 to 6 carbon atoms and 1 to 3 halogen atoms, and R''' is a cyclomethylene group having 3 to 6 carbon atoms and including at least one halomethylene.

9. In the control of foliar fungi, the method of spraying the foliage with a mixture containing from 0.25 to 2 pounds per gallon of at least one compound having a particle size of from about 0.2 to 50 microns the compound being a 2,4-dinitrophenylhydrazone having a formula selected from the group consisting of $$RR'C=NNH-C_6H_3(NO_2)_2$$

$$R''{>}C=NNH-C_6H_3(NO_2)_2$$

and $$R'''C(R)=NNH-C_6H_3(NO_2)_2$$

where R is selected from the group consisting of hydrogen, methyl and chloromethyl, R' is a halogenated aliphatic radical having 2 to 6 carbon atoms and 1 to 3 halogen atoms, R'' is a halogenated cycloaliphatic radical having 3 to 6 carbon atoms and 1 to 3 halogen atoms, and R''' is a cyclomethylene group having 3 to 6 carbon atoms and including at least one halomethylene.

References Cited in the file of this patent

UNITED STATES PATENTS 2,548,480    Kittleson              Apr. 10, 1951
2,818,367    Jaworski              Dec. 31, 1957

OTHER REFERENCES

Horsfall: "Fungicides and Their Action," vol. II, 1945, Chronica Botanica Comp., pp. 155, 156.